Figure 1:
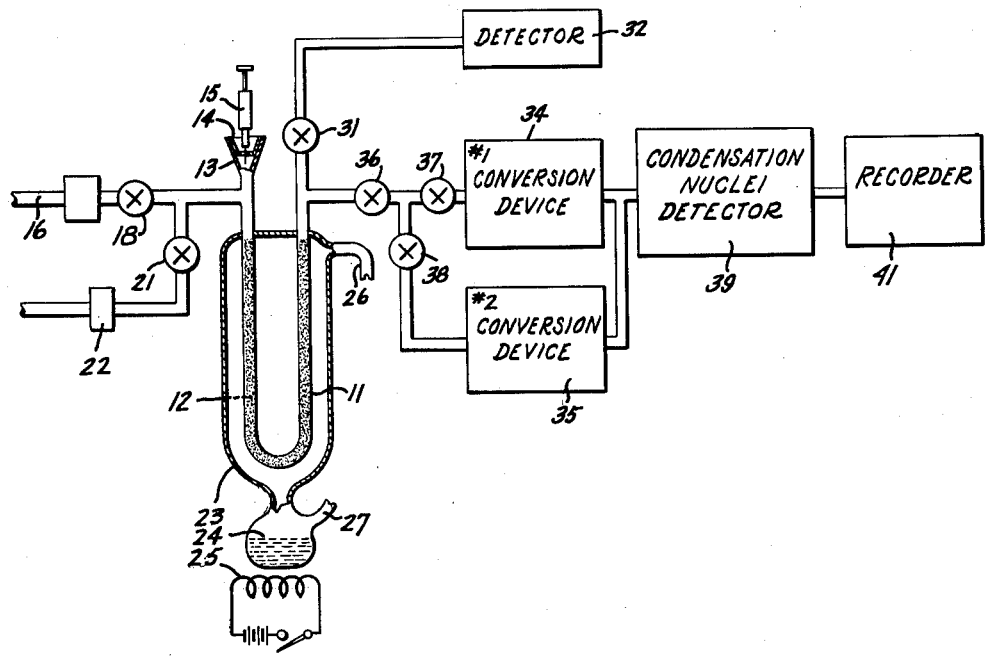

July 14, 1964  S. B. DUNHAM  3,140,598
APPARATUS FOR CHROMATOGRAPHIC GAS ANALYSIS
Filed May 24, 1962

Inventor
Stuart B. Dunham
by Charles W Helzer
His Attorney

APPARATUS FOR CHROMATOGRAPHIC GAS ANALYSIS

Stuart B. Dunham, Schenectady, N.Y., assignor to General Electric Company, a corporation of New York
Filed May 24, 1962, Ser. No. 197,453
1 Claim. (Cl. 73—23.1)

The present invention relates to a new and improved apparatus for gas analysis.

More particularly, the invention relates to a new and improved apparatus for increasing the sensitivity and resolution of a gas analysis technique known as gas chromatography.

In one of the known techniques of gas analysis, generally identified as gas or vapor flow chromatography, it is the practice to pass a gaseous sample through suitable adsorbents enclosed within a glass or steel tube known as a chromatographic column. It is a characteristic of a chromatographic column with respect to certain gaseous mixtures to hold up or time delay certain constituent gases relative to other gases in the mixtures. The result is a breaking up or fractionating of the gaseous mixture into its various constituent gases. These fractionated constituent gases then may be supplied to a suitable ionization detector or a hydrogen flame detector where their presence may be identified, and their location timewise relative to the other constituent gases emanating from the chromatographic column, may be plotted on a time base recorder. This results in a chromatogram which is in the nature of a spectrogram of the constituent gases out of which a particular gaseous mixture being analyzed, is composed. Although gas chromatography apparatus of the above described type is used throughout industry for gas analysis purposes, for many gaseous mixtures it is not adequate because of lack of sensitivity or lack of resolving power.

It is the primary object of the present invention to provide a new and improved apparatus for gas analysis which may be used to greatly improve the sensitivity and resolving power of conventional gas or vapor flow chromatography apparatus.

In practicing the invention an apparatus for gas analysis is provided which employs a gas chromatographic column, a gas-to-nucleogenic particle conversion device, and a condensation nuclei meter. In carrying out the novel method of gas analysis, a gaseous sample to be analyzed is passed through the chromatographic column where it is separated time-wise into its various constituent gases. These separated or fractionated constituent gases are then converted from the gas to nucleogenic particles, and the nucleogenic particles produced at the output of the conversion device are supplied to the condensation nuclei meter which measures the numbers of nucleogenic particles produced at varying points of times starting with time equal zero at the point of time when the sample to be analyzed is introduced into the chromatographic column. It is anticipated that this novel apparatus will be used in conjunction with conventional gas or vapor flow chromatography apparatus to thereby greatly improve the sensitivity and resolving power of the chromatography apparatus in a manner that will be appreciated more fully hereinafter.

Figure 2:
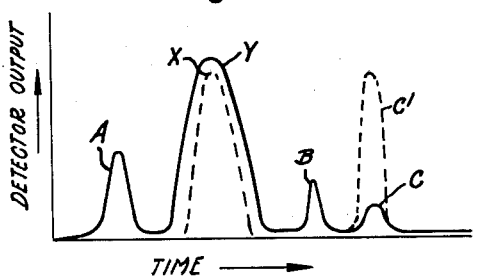

Other objects, features and many of the attendant advantages of this invention will be appreciated more readily as the same becomes better understood by reference to the following detailed description, when considered in connection with the accompanying drawing, wherein:

FIGURE 1 is a schematic diagram of a novel gas analysis apparatus constructed in accordance with the invention, and with which the novel method of gas analysis made possible by the invention can be conducted; and FIGURE 2 is a chromatogram illustrating a typical output signal versus time recording obtained with the gas analysis apparatus shown in FIGURE 1.

The gas analysis apparatus shown in FIGURE 1 of the drawing comprises a chromatographic column 11 which may be a glass or stainless steel U-tube having its interior surfaces coated with a suitable adsorbent material 12, such as alumina ($Al_2O_3$). Alternatively, the chromatographic column 11 could enclose pieces of solid adsorbent material such as pieces of glass, alumina, or other known adsorbents within the U-tube. For certain substances glass performs admirably as an adsorbent to adsorb different gases at different rates. The chromatographic column 11 is a commercially available item, and may be purchased from a number of manufacturing firms such as Perkin-Elmer Corporation, the Burrell Corporation, or the Fisher Corporation, and have been described in detail in numerous articles appearing in the art. For example, see the textbook entitled "Gas Chromatography," published by Butterworths Publishing Co., Washington, D.C., in 1960, edited by R. P. W. Scott, made and reprinted in Great Britain by William Clowes and Sons, Limited, London, England. One end of the chromatographic column 11 terminates in an enlarged cup portion 13 which has a permeable seal 14 closing it. The permeable seal 14 is adapted to be penetrated by a syringe indicated at 15 which contains a sample of the gaseous mixture to be analyzed. The gaseous sample is introduced into penetrating the seal 14 with the needle point of the syringe 15, and thereafter injecting the gaseous sample to be analyzed into the chromatographic column. In order to insure that the sample mixture to be analyzed travels through the chromatographic column 11, a carrier gas may be directed through the chromatographic column from an input connection 16 to the atmosphere by way of a filter 17 and a stop valve 18 connected to the inlet side of the chromatographic column 11 below the cup portion 13. As will be discussed more fully hereinafter, the measurement apparatus used generally pulls a small vacuum so that it is assured that flow of the carrier air from the atmosphere will take place, and the gaseous sample being analyzed will be drawn through the chromatographic column 11. Alternatively, the inlet side of the chromatographic column 11 may be connected through a stop valve 21, and suitable regulating valve 22, to the discharge side of a tank of process nitrogen, or the like, which may be used as the carrier gas for drawing the gaseous sample being analyzed through the chromatographic column 11.

In passing through the chromatographic column 11, the various constituent gases making up the mixture being analyzed, will be adsorbed by the adsorbent material 12 in the chromatographic column at varying rates depending upon what particular adsorbent material is used and, of course, dependent upon the particular constituent gases. As a consequence, the constituent gases will emanate from the outlet end of the chromatographic column 11 at varying time intervals, dependent upon the adsorption rate of the adsorbent material 12, in the chromatographic column. In most gas chromatography apparatus it is desirable to maintain the temperature of the adsorbent material 12 in the chromatographic column 11 constant so that the rate of adsorption of the constituent gases therein does not vary with temperature. For this purpose, a vapor heating system is provided which is comprised by a container 23 that surrounds the chromatographic column 11 and which has a pool 24 of low boiling point fluid such as mercury, located at the lowest level. This pool of low boiling point fluid is heated by a heating coil 25 energized from an appropriate source of electric current through an on-off switch for controlling the heat supplied to the pool of mercury 24. Upon being heated the mercury vapor passes up around the chromatographic column 11 and will function to maintain the temperature of the adsorbent material within the column at a constant value. As a consequence, the adsorption characteristics of the adsorbent material will not vary with temperature, thereby assuring that the role of adsorption of the various constituent gases is determined only by their adsorption characteristics. The two connections indicated at 26 and 27, connect the top of the container 23 to a suitable condensing apparatus (not shown), and connect the outlet side of the condensing apparatus back to the pool of mercury 24 so that a closed loop heating system is provided.

The constituent gases emanating from the outlet end of the chromatographic column 11 are supplied through a stop valve 31 to a detector 32. The detector 32 may comprise a conventional flame ionization detector or thermal conductivity detector depending upon the nature of the gaseous mixture being analyzed. The construction and operation of conventional detector 32 has been described quite completely in the above referenced literature, and hence, will not be described in detail. It is believed adequate for the purpose of the present disclosure to point out that the detector 32 serves to convert the constituent gases being supplied from the outlet end of the chromatographic column 11 into an output electrical signal which may be applied to a recorder to provide in effect a spectrogram of the constituent gases of the mixture being analyzed. Such a spectrogram, chromatogram as it is known, is illustrated in FIGURE 2 of the drawing wherein the detector output response is plotted as the ordinate and time is plotted as the abscissa. From the examination of FIGURE 2, it can be seen that the constituent gases A, Y, B, C will be separated in time by an amount determined by the adsorption qualities of the adsorbent material 12 contained in the chromatographic column 11. The chromatograms are known for a large variety of gaseous mixtures so that by comparing the chromatogram produced by detector 32 against a known chromatogram, the composition of a gaseous mixture can be readily identified.

While the chromatographic apparatus described thus far is satisfactory for use in the analysis of many gaseous mixtures, certain difficulties are encountered in practice which can be appreciated from an examination of FIGURE 2. From FIGURE 2 it can be seen that the gaseous constituent indicated by the response peak Y, overlaps and includes a gaseous constituent X which can be said to have the same adsorption rate for the particular adsorbent material 12 as the gas Y. In order to identify gas X from gas Y, some means must be provided for separating these two constituent gases. Further, the sensitivity of the detector 32 for certain constituent gases may not be as great as it is for other gases. This difficulty is exemplified by the small response peak, shown at C, which may be considered to represent the peak output signal produced by a conventional detector 32 for one of constituent gases C. It is also conceivable that very minute traces of constituent gases would not be detectable at all by the conventional detector 32 where, with a more sensitive instrument, a response such as is shown by the dotted curve C' might be obtained. It is the purpose of the present invention to provide an instrument having the sensitivity such as to produce a large output signal for very minute traces of constituent gases.

In order to overcome the difficulties described in the preceding paragraph, the apparatus comprising the present invention was devised. This apparatus preferably includes two gas-to-nucleogenic particle conversion devices shown at 34 and 35 which have their inputs connected to the outlet of the chromatographic column 11 through a suitable valving arrangement comprised by the stop valves 36, 37, and 38. The conversion device 34 may comprise any one of the known gas-to-nucleogenic particle conversion devices available in the art. For example, it may be formed by the device described in United States Patent No. 2,897,059, entitled "Process and Apparatus for Gas Detection," by F. W. Van Luik, Jr., issued July 28, 1959, and assigned to the General Electric Company. The conversion device described in Patent No. 2,897,059 operates to convert both carbon dioxide and carbon monoxide gas to nucleogenic particles. The conversion device 35 may be comprised by any of the known gas-to-nucleogenic particle conversion devices. For example, a device such as described in United States application Serial No. 59,584, entitled "Method and Apparatus for Detecting Gases or Vapors," F. W. Van Luik, Jr., and Stuart B. Dunham, inventors, assigned to the General Electric Company. The conversion device described in the above-identified copending United States patent application is capable of converting the following list of gases into nucleogenic particles:

Red fuming nitric acid
Sulfur trioxide
Nitrogeneous compounds such as unsymmetrical dimethyl hydrazine, monoethylamine, diethylamine, triethylamine and ammonia.

In addition to the above listed gases, there are known conversion devices for converting the following gases to nucleogenic particles; however, it is not intended that applicant's invention is to be restricted to operation with the gases listed above and hereinafter for it can be made to operate properly with any available gas to nucleogenic particle conversion device. Accordingly, the following list is to be considered as exemplary only, and in no way restricts the use of applicant's invention to these gases. The gases are:

Aliphatic hydrocarbons such as Solvesso 100,
Aromatic hydrocarbon solvents such as toluene, benzene, naphtha and xylene,
Ethyl and methyl alcohol,
Unsaturated hydrocarbons such as cyclohexene, octene, and di-iso-butylene,
Hydrogen sulphide,
Sulfur dioxide,
Sulfur hexafluoride,
Sulfur tetrachloride,
Sulfur monofluoride, and many volatile sulfur halide liquids and solvents.

For a more detailed description of the construction and operation of the gas-to-nucleogenic particle conversion device, reference is made to the above-identified United States Patent 2,897,059 and to the copending Van Luik and Dunham application Serial No. 59,584. Briefly, however, it may be stated that these devices operate to convert an incoming gaseous sample into a characteristic number of nucleogenic particles of the type which can serve as condensation nuclei. This conversion may be accomplished through chemical reaction or through reaction with a hot platinum wire, a source of ultraviolet light, a spark gap, or through some other suitable mechanism for converting the gaseous component into condensation nuclei particles.

The condensation nuclei produced by the conversion devices 34 or 35 are supplied to the input of a condensation nuclei detector 39, and thence to a recorder 41 of conventional construction. One suitable instrument for use as a condensation nuclei detector 39, is disclosed in United States Patent No. 2,684,008, B. Vonnegut, entitled "Method and Apparatus for Measuring the Concentration of Condensation Nuclei," issued July 20, 1954, and assigned to the General Electric Company. Alternatively, the condensation nuclei detector 39 may be comprised by the apparatus described in United States Patent No. 2,791,901, entitled "Apparatus for Measuring Condensation Nuclei," T. A. Rich, inventor, issued May 14, 1957, and assigned to the General Electric Company. Other condensation nuclei detection apparatus are available in the art and my be used as detector 39 however, for the most applications it is believed that either of the detecting devices described in the above-identified United States Patent No. 2,684,008 and Patent No. 2,791,901 will be satisfactory for most applications.

In each of the condensation nuclei detectors identified, the condensation nuclei are first humidified by passing the nuclei particles through a suitable humidifier and are then supplied to an expansible chamber. In this chamber the humidified condensation nuclei particles are subjected to an atmosphere which is suddenly expanded to cause the moisture contained in the gas surrounding the nuclei particles to condense upon the individual condensation nuclei particles as condensation centers. By this action a number of individual water droplets are formed which, under suitable illumination, will scatter sufficient light to allow a measurable indication of the number of condensation nuclei particles to be obtained. It has been determined heretofore that many known gases will give off characteristic numbers of condensation nuclei particles upon conversion and that these characteristic numbers of condensation nuclei particles can be used to identify the particular gas involved. Since the condensation nuclei detector itself is extremely sensitive, that is, it is able to sense even very slight traces of a gas present in an atmosphere where the trace may be present in a few parts per million, the condensation nuclei detector becomes a powerful adjunct for use in connection with gas chromatography apparatus to identify minute traces of constituent gases in a gaseous mixture. Accordingly, if a chromatogram, such as shown in FIGURE 2, were being prepared of a gaseous mixture, and it was questioned whether a gas was present at a point C in the chromatogram because background noise or other extraneous factors tended to submerge it, it would be possible to positively identify the presence of the gas C by passing the outlet constituent gases from the chromatographic column 11 into one of the conversion devices 34 and 35 and subsequently obtain a condensation nuclei measurement with the detector 39. Because of the high sensitivity of the condensation nuclei detector 39, it would then be possible to positively identify the presence of such a gaseous mixture C since the output of the condensation nuclei detector would appear when plotted much as shown by the dotted curve C'. In this manner, the sensitivity of the gas chromatography apparatus is greatly increased.

The second problem mentioned in the preceding paragraph is one of resolving power in the situation where one gaseous constituent such as the gas represented by the fraction Y, dwarfs or drowns out the presence of a signal due to a second gaseous constituent such as the gas represented by the fraction X. In such a situation it would be possible to provide a gas chromatography apparatus modified in the manner of the present invention to include a gas to nucleogenic particle conversion device 34 or 35, which is responsive only to the constituent gas represented by the fraction X. With such an apparatus it would then be possible to positively identify the presence or absence of the constituent gas represented by the fraction X in the output chromatogram produced by the gas chromatography apparatus. In this manner, the resolving power of the over-all instrument is greatly improved since it would now be possible to separate and positively identify overlapping constituent gases.

From the foregoing description it can be appreciated that the invention provides a new and improved method and apparatus for gas analysis which greatly improves both the sensitivity and resolving power of currently available gas chromatography apparatus. Accordingly, having described one embodiment of a new and improved gas analysis apparatus constructed in accordance with the invention, it is believed obvious that other modifications and variations of the invention are possible in light of the above teachings. It is therefore, to be understood that changes may be made in the particular embodiment of the invention described which are within the full intended scope of the invention as defined by the appended claim.

What I claim as new and desire to secure by Letters Patent in the United States is:

A gas analyzing apparatus comprising a chromatographic column, means for introducing a carrier gas into the chromatographic column, means for introducing gaseous sample to be analyzed into the chromatographic column along with the carrier gas, means for heating the chromatographic column for maintaining its temperature substantially constant, a plurality of gas-to-nucleogenic particle conversion devices, valving means connected between the output of the chromatographic column and the inputs of said gas-to-nucleogenic particle conversion devices for selectively supplying the fractionated gaseous sample emanating from the output of the chromatographic column to the input of a selected one of the conversion devices, and a condensation nuclei meter having its input effectively connected to the outputs of the plurality of gas to nucleogenic particle conversion devices.

References Cited in the file of this patent

UNITED STATES PATENTS

| | | |
|---|---|---|
| 2,899,059 | Van Luik | July 28, 1959 |
| 2,959,677 | Robinson et al. | Nov. 8, 1960 |

OTHER REFERENCES

Phillips: Gas Chromatography, Academic Press Inc., New York, 1956 (pages 24 and 36 relied upon).